Aug. 3, 1965  E. B. WHITE, JR  3,198,137
TRACTION VEHICLE
Filed Feb. 7, 1963  7 Sheets-Sheet 4

INVENTOR.
Eugene B. White, Jr.,
BY
Cromwell, Greist & Warden

INVENTOR.
Eugene B White, Jr.

# United States Patent Office 3,198,137
Patented Aug. 3, 1965

3,198,137
TRACTION VEHICLE
Eugene B. White, Jr., Park Forest, Ill., assignor to Whiting Corporation, a corporation of Illinois
Filed Feb. 7, 1963, Ser. No. 256,973
25 Claims. (Cl. 105—26)

This invention relates to lightweight traction vehicles of the type adapted for moving railway cars along a track in a yard or shop, and more particularly to an improved lightweight rail traction vehicle adapted for movement either along railway tracks or on the ground.

For many years the industry has been faced with the problem of economically moving railway cars in shops and yards where it is not practical to have a locomotive in attendance at all times. Switching locomotives of conventional design have been used for moving railway cars in yards and tracks, but these locomotives are quite expensive to purchase and maintain and they occupy considerable space. Lightweight traction vehicles, such as the vehicles shown by Bock et al. in U.S. Patents Nos. 2,718,195 and 2,718,197, have been developed for moving railway cars along tracks in yards and shops. These lightweight traction vehicles have proved to be quite satisfactory and they have received widespread acceptance in the industry.

Such vehicles generally include a small rigid frame having a set of rail wheels secured thereto and an appropriate internal combustion engine for driving these wheels. A coupler adapted for mating engagement with the coupler of a railway car is suitably secured on the vehicle frame. Preferably, these vehicles include a set of road wheels adapted to be moved from a retracted position to a ground engaging position thereby allowing the vehicle to be driven over the ground and positioned over a railway track where the rail wheels can be lowered into place on the track. These traction vehicles include a small cab in which an operator rides, and the cab is equipped with suitable controls for operating the internal combustion engine and for raising and lowering the road wheels, which road wheels are driven by the same internal combustion engine used to drive the rail wheels.

Since these vehicles are relatively lightweight, at least as compared to the weight of a switch engine or a conventional locomotive, they are preferably equipped with means for developing, when coupled to a railway car, a tractive force greatly in excess of the tractive force attributable to the weight of the traction vehicle itself. This may be accomplished as shown in U.S. Patent No. 2,721,522 to Ames by providing a railway car coupler on the traction vehicle, which coupler is adapted to be moved vertically by hydraulic means. The coupler includes means for engaging the underside of a railway car coupler when the railway car coupler is in mating engagement with the coupler on the traction vehicle. Upward movement of the coupler on the traction vehicle when it is in mating engagement with the coupler on the railway car results in transferring a portion of the weight from the railway car to the traction vehicle thereby allowing the latter to develop a tractive effort greatly in excess of the tractive effort attributable to its own weight.

Known traction vehicles of the type described above include a rail wheel assembly including two pairs of rail wheels. These rail wheels are either individually mounted to stub axles and driven from a common cross shaft, or each wheel of a pair of rail wheels is rigidly mounted to a common axle, which axle contains a sprocket wheel adapting it to be driven by a chain drive. In either instance, relative movement between either of the wheels of a laterally spaced pair of rail wheels is impossible. Of course, in all known locomotives and railway cars the wheels of the pairs of laterally spaced rail wheels are each rigidly mounted to a common axle, i.e., there is no provision for relative movement between the wheels of any pairs of rail wheels. This feature makes it more difficult for a rail vehicle, whether it be a locomotive or a traction vehicle, to pull one or more railway cars around a curve. This is because the wheels on the outermost rail of the curve must travel a greater distance than the rail wheels on the inner rail of the curve. In other words, since the wheels of a laterally spaced pair of wheels are not permitted to move relatively with respect to each other, the innermost rail wheel of these wheels must slip on the inner rail making up the curve. This factor becomes of extreme importance in the design of lightweight traction vehicles where it is desired to provide such a vehicle with minimum size and minimum power and at the same time achieve a maximum tractive effort. Among other things, this invention, for the first time, provides in a rail traction vehicle means for preventing slipping movement of the rail wheels on the inner rail of a curve when the vehicle is traversing such a curve. The driving mechanism for known traction vehicles of the type described has necessarily been somewhat complicated because of the fact that all of the rail wheels and at least a pair of the road wheels are all driven from a single internal combustion engine. As an even further complicating factor, since the road wheels are mounted to the traction vehicle for movement between the retracted and load engaging positions, articulated driving means is necessary for driving a pair of the road wheels.

Accordingly, a primary object of this invention is to provide a new and improved rail traction vehicle which will be free from the disadvantages of traction vehicles known in the prior art.

A more specific object of the present invention is the provision of a rail traction vehicle having a rail wheel assembly adapting the vehicle for rail travel, which assembly includes non-slip differential driving means.

A further object of the present invention is the provision of a rail traction vehicle having a rail wheel assembly, which assembly includes a pair of driving axles one of which axles is movably mounted to the vehicle.

Another object of the invention is the provision of a rail traction vehicle including a rail wheel assembly and a road wheel assembly, which vehicle includes improved means for driving the road wheels.

A further object of the invention is the provision of a rail traction vehicle having a rail wheel assembly and a road wheel assembly, which vehicle has improved means for driving the road wheels and wherein the axis of rotation of the road wheels is parallel to the axis of rotation of the rail wheels.

An even further object of the invention is the provision of a rail traction vehicle having an improved coupler for transferring a portion of the weight of a railway car to the traction vehicle.

A still further object of the invention is the provision of a traction vehicle having improved means for dispensing sand or the like on the rails of a railway track.

These and other objects and advantages of the invention will become apparent from the following specification wherein like numerals refer to similar parts throughout.

Briefly, and by way of introduction, the rail traction vehicle of this invention includes a rigid frame having a rail wheel assembly secured thereto, which assembly includes a forward axle resiliently mounted to the frame with a rail wheel provided at each end of this axle. The rail wheel assembly also includes a rearward axle rigidly secured to the frame with a rail wheel at each end of this axle. All four rail wheels are powered by an internal combustion engine, and non-slip or traction differential drive means is associated with the forward and rearward axles allowing all rail wheels to be independently driven. This new differential drive feature helps prevent a power loss in the traction vehicle from rail wheel slippage, and it reduces the tendency of the vehicle to derail itself as will be explained further hereinafter. The rail traction vehicle also includes a road wheel assembly, which assembly comprises a pair of steerable road wheels located forward of the forward rail axle and a pair of trailing road wheels located intermediate the forward and rearward rail axles. Each of the road wheels is individually mounted on a short stub axle, which axle is a part of mounting means for swinging or pivoting all of the road wheels between an upper retracted position and a lower ground engaging position. The stub axles are not driving axles—there is no direct driving connection between the internal combustion engine and the road wheels. The pair of rearward or trailing road wheels are driven in a novel and quite effective manner when all of the road wheels are in their ground engaging position. This is accomplished by swingably mounting the road wheels to the vehicle in such a manner that when the road wheels are in their ground engaging position, i.e., when the frame of the vehicle and the rail wheel assembly secured thereto are elevated to a position where the rail wheels are no longer in contact with a railway track, the trailing road wheels will be in frictional engagement with driving surfaces on the forward pair of rail wheels, which driving surfaces are distinct from the rail engaging surfaces of this pair of rail wheels. It will be recalled that the rail wheels are powered by the internal combustion engine and that differential drive means is associated with each pair of rail wheels. Accordingly, when the road wheels are in the position described, power from the internal combustion engine will be transmitted to the trailing road wheels through the forward pair of rail wheels. Manifestly, this novel drive means for the road wheels by frictional engagement of the treads of the trailing road wheels with the rail wheel driving surfaces permits a road wheel assembly of simple and inexpensive construction. Each of the road wheels may be mounted on a short stub axle; differential axles and drive shafts are not required for the road wheel assembly. The rail traction vehicle also includes means for resiliently mounting the forward rail axle to the vehicle, thereby allowing the rail wheel assembly to adapt itself to uneven railway track, thereby reducing the possibility of derailment of the traction vehicle. Even further, the rail traction vehicle includes a coupler resiliently mounted on the rear of the traction vehicle intermediate the forward and rearward pairs of rail wheels, which coupler includes means for transferring a portion of the weight of a railway car to the rail traction vehicle for increasing the tractive effort developed by the traction vehicle.

Figures 1, 2:
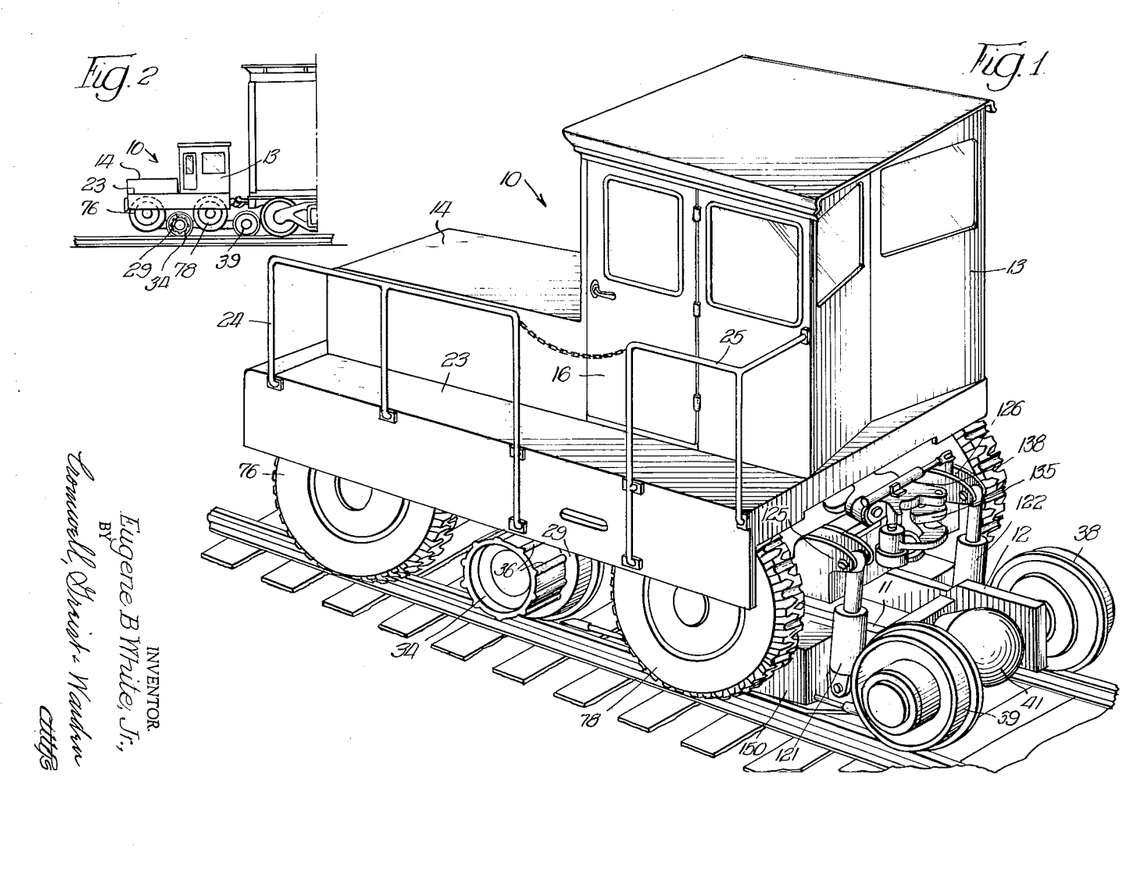
FIG. 1 is a perspective view of the rail traction vehicle of this invention.
FIG. 2 is a view in elevation showing the rail traction vehicle coupled with a railway car.
Figure 3:
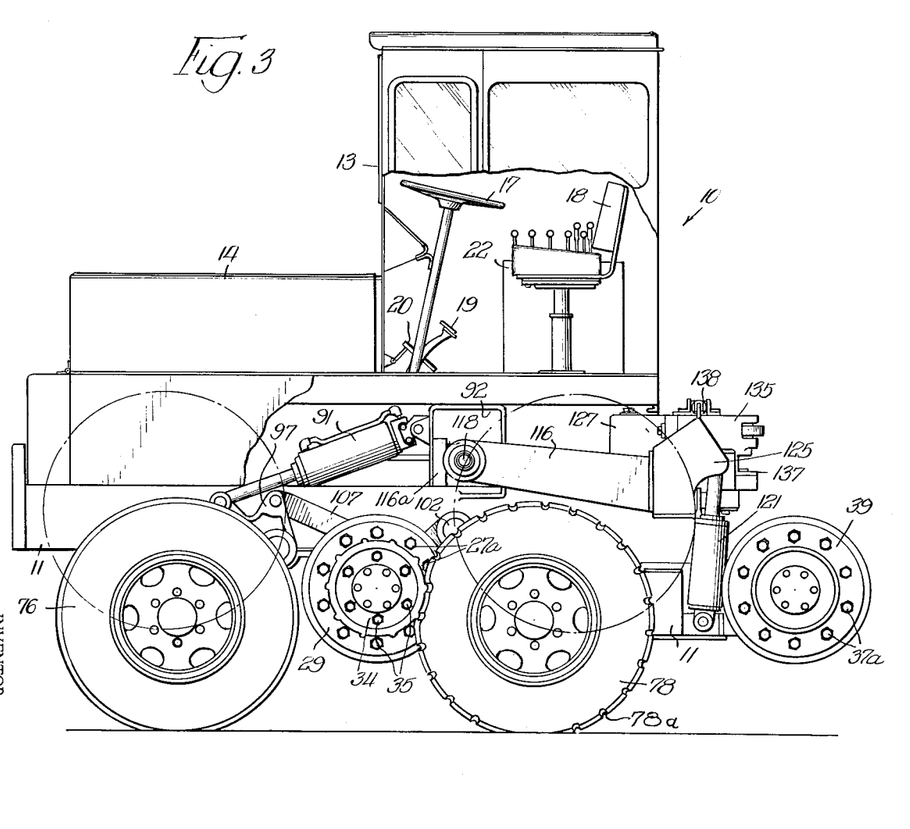
FIG. 3 is a partially broken away view in elevation of the rail traction vehicle.

Referring to the drawings, and especially to FIGS. 1 through 4, the rail traction vehicle of this invention will be seen to include a body, generally designated 10, supported from a pair of laterally spaced, longitudinally extending, frame members 11 and 12, which frame members are vertically offset intermediate the ends thereof as best seen in FIG. 3. The body 10 includes an operator's cab 13 and a hood 14 for enclosing an internal combustion engine (not shown). The cab 13, which may be entered through a door 16, is provided with a steering wheel 17 and an operator's seat 18. The cab also includes brake and accelerator pedals 19 and 20, respectively, and a hydraulic control panel 22. As seen in FIG. 1 the cab 13 and hood 14 are horizontally offset to one side of the body 10, and a walkway 23 extending along one side of the body is provided to allow access to the cab and hood. Preferably, railing members 24 and 25 are secured to the body along the walkway thereof to prevent a person using the walkway from falling from the vehicle.

Figure 7:
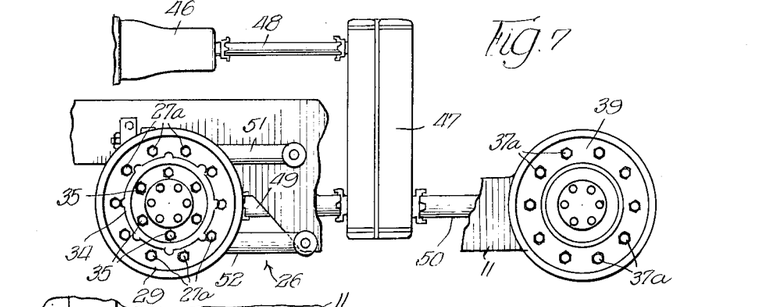
FIG. 7 is a partially broken away side view of the rail wheel assembly of the rail traction vehicle.
Figure 8:
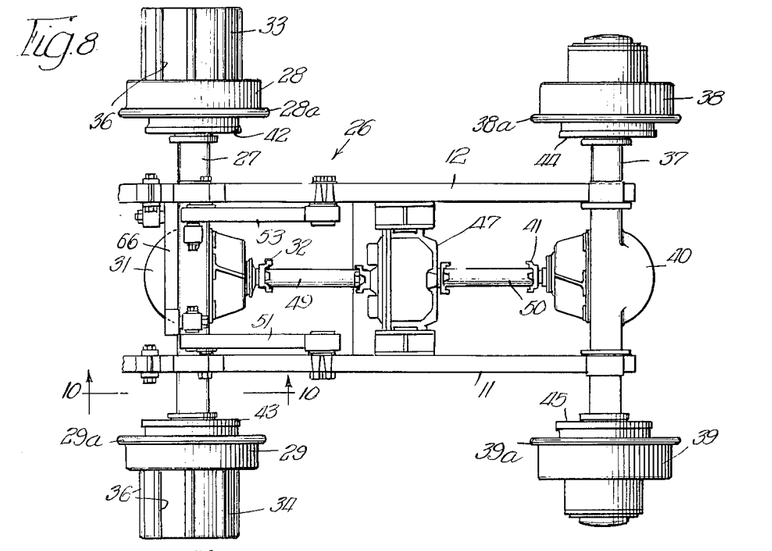
FIG. 8 is a plan view of the rail wheel assembly of the traction vehicle.

The new and improved rail wheel assembly, generally designated 26, of the traction vehicle of this invention will be best understood by referring first to FIGS. 7 and 8. The rail wheel assembly includes a forward axle 27 having rail wheels 28 and 29 detachably mounted to the ends thereof by a plurality of bolts 27a. The rail wheels are of the usual shape but they are slightly smaller in size than conventional railway car wheels. The wheels 28 and 29 include flanges 28a and 29a, respectively. The forward axle 27 is of the driving differential type, and it includes a differential 31, which differential connects with a universal joint 32. The differential used is of the non-slip or traction type. The rail wheels 28 and 29 include axially extending cylindrical driving surfaces or hubs 33 and 34, respectively, secured to the outer faces thereof as by bolts 35. Each hub is provided with a plurality of integral, axially extending, circumferentially spaced-apart ribs 36 adapting the hubs for frictionally driving trailing road wheels of the traction vehicle as will be referred to hereinafter.

The rail wheel assembly 26 also includes a rear axle 37 having rail wheels 38 and 39 detachably mounted at the ends thereof by a plurality of bolts 37a. These rail wheels are of the same size and design as the rail wheels 28 and 29; the rail wheels 38 and 39 include flanges 38a and 39a, respectively. The rear axle 37 is also of the driving, non-slip, differential type, and it includes a differential 40 connecting with a universal joint 41. The forward pair of rail wheels 28 and 29 are provided with brake drums 42 and 43, respectively, and the rearward pair of rail wheels 38 and 39 are provided with respective brake drums 44 and 45. A suitable brake mechanism, either of the hydraulic or pneumatic type, is associated with these brake drums and adapted to be actuated by movement of the brake pedal 19 within the cab, thereby allowing braking to be given to the rail traction vehicle for controlling its movement when on a railway track.

As mentioned above, all rail wheels are driving wheels thereby enabling the traction vehicle to develop a maximum tractive effort. The rail wheels are driven from a suitable internal combustion engine (not shown) carried by the traction vehicle within the hood 14, which internal combustion engine has a torque converter 46 (see FIG. 7) mounted thereto. Power from the torque converter 46 is transmitted to a transmission gear box 47 by a cardan shaft 48. A pair of colinear cardan shafts 49 and 50 extend in opposite directions from the lower portion of the transmission gear box, and they are secured to the universal joints 32 and 41, respectively. It will be apparent that by this construction power from the internal combustion engine will be transmitted to both of the rail axles. The transmission gear box 47 contains selective reduction gearing means for assisting in gearing down power from the internal combustion engine. Preferably, the gear box contains disconnect means for selectively disconnecting power transmitted to the rear rail axle 37. As it will be apparent hereinafter, it is desirable to prevent rotation of the rear rail wheels when the trailing road wheels are being driven by the forward rail wheels.

It is believed that the significance and advantages of the construction of the above described rail wheel assembly will be best understood by briefly reviewing the operation of non-slip or semi-lock differentials as well as the behavior of the railway assembly as it traverses a curve and straight section of track under varying rail surface conditions.

The traction vehicle is preferably provided with fully automatic non-slip differentials of the type manufactured by Detroit Automotive Products Corporation of Detroit, Michigan. However, the traction vehicle of this invention may be provided with other suitable non-slip differentials such as those shown in United States Patents Nos. 2,817,251, 2,821,096, 2,932,218 or 2,971,404, for example. Briefly, the non-slip differential made by Detroit Automotive Products Corporation includes a ring-like center cam encircled by a ring gear driven spider member, which spider includes a ring portion having fixed driving clutch teeth on each side thereof. A pair of driven clutch members are mounted one on each side of the spider, and each clutch member is provided with teeth for mating engagement with the teeth on the spider. Each clutch member is also provided with cam surfaces adapted to mesh with cam surfaces on the center cam member. Each clutch member, which is in driving relationship with an axle having one of the rail wheels secured thereto, is axially shiftable in the differential housing and appropriate spring means is provided for constantly urging the clutch members into engagement with the spider. With this differential when the traction vehicle is being driven in a straight forward direction the clutch teeth on both sides of the spider assembly are fully engaged with the clutch teeth on each driven clutch member. Likewise, the fixed cams on the driven clutch members are fully meshed with the cam surfaces on the center cam ring. In this condition both clutches remain fully engaged so that the differential operates as a solid unit and each rail wheel is driven forward at ring gear speed. The differential also acts as a unit with each rail wheel being forced to rotate at ring gear speed when the traction vehicle is driven in a reverse direction. When the traction vehicle is making a turn this non-slip differential allows either rail wheel to turn faster than ring gear speed but does not permit either wheel to turn slower than ring gear speed when power is applied. This feature distinguishes the non-slip differential from conventional differentials which permit the outside wheel to turn faster than ring gear speed while the inside wheel turns slower than ring gear speed. With the differential just described when the traction vehicle is making a turn the teeth on the spider and on the clutch member on the outside of the turn are disengaged by the cam surfaces on this clutch member and on the center cam ring. This disengagement allows the rail wheel on the outside of the turn to rotate faster than ring gear speed. The rail wheel on the inside of the turn operates at ring gear speed as the inner driven clutch remains directly geared to the spider by the action of the mating teeth on the spider and on the inside clutch member. This engagement and disengagement or indexing operation of the outside clutch and spider continues throughout the turn. If the traction vehicle is traveling along a length of track and one rail wheel encounters uneven or slippery rail conditions both driving rail wheels will remain locked and revolve at ring gear speed. If one rail wheel should encounter ice conditions on a rail both rail wheels will rotate at ring gear speed whether the vehicle is moving in a straight or curved path.

Referring to FIG. 8, let it be assumed that the rail wheel assembly is traveling to the left along a railway track, which track begins to curve to the left just ahead of the forward pair of rail wheels. Assume also for the moment that both axles of the rail wheel assembly are of conventional design, i.e., the forward and rearward pairs of rail wheels each include a single one piece axle thereby preventing relative rotation between the wheels of the pairs of rail wheels. As the rail wheel assembly approaches the curve, the entire assembly has a tendency because of this arrangement of rail wheels to continue in a straight path. Accordingly, the rail wheel 28 has a tendency to jump the track and derail the rail wheel assembly. The rail wheel 28 is prevented from leaving the track by the action of the flange 28a engaging the inside of the outer rail of the track curve. This action of the rail flange 28a engaging the inside of the outer rail forces the railway assembly to remain on the track and traverse the curve. If the rail wheel 28 should encounter a low or depressed section of track at this point of commencing the curve, the possibility of derailment becomes very real. As the rail wheel 28 rolls along the outer rail, which rail is of a greater length than the inner rail at the curve of the railway track, the rail wheel 29 must slip on the inner rail. The rear pair of rail wheels 38 and 39 will behave in a similar manner as they approach and traverse the curve. It will be apparent from the above discussion that because relative movement between any two rail wheels making up one of the pairs of rail wheels is impossible, there is a tendency of derailment and there is a substantial loss of power due to the slipping effect of the rail wheel which rolls on the inner rail of the curve and due to the rubbing between the flanges of the wheels on the outer rail with the inside of the outer rail. The arrangement of rail wheels just described, which is conventional in the construction of all locomotives and railway cars, presents problems in the operation of railway trains, but these factors become of much greater importance in the operation of traction vehicles where the torque applied to the driving rail wheels is quite high and where the source of power must of necessity be limited to keep traction vehicles relatively small and of light weight construction. Further, in the operation of traction vehicles wherein a portion of the weight of the railway cars is transferred to the vehicle for increasing the tractive effort of the latter, the power loss resulting from slipping of the rail wheels on the inner rail of a track curve is greatly increased because of the corresponding increase in friction due to the added load on the rail wheels.

It should be apparent that by the construction of the rail wheel assembly of this invention, i.e., the provision of a non-slip differential with each of the driving axles, there is a reduced tendency of the rail wheels on the outer rail of a curve to derail and the rail wheels on the inner rail of the curve will not slip or be driven at less than ring gear speed because of the construction of the non-slip differential. The tendency of derailment will be reduced as the outer rail wheels will not attempt to climb the outer rail because of the indexing of the clutch teeth on the spider and outer driven clutch member. Not only is relative movement between the wheels of a pair of rail wheels possible, but by the use of the non-slip differential described the inner rail wheels will be driven at differential ring gear speed while the outer rail wheels will be allowed to rotate at a faster speed while traversing a curve. If one of the rail wheels of a pair of rail wheels should encounter ice while the traction vehicle is make a curve, both rail wheels will be driven at ring gear speed. The provision of non-slip differentials on the traction vehicle is not only of great advantage when the traction vehicle is make a curve, but these differentials are of great advantage when the traction vehicle is proceeding along a straight length of track, which track may be slippery or uneven. In this instance, should one of the rail wheels become separated from one of the rails because of an uneven condition of the latter or if one rail wheel should otherwise lose traction, this rail wheel and the other rail wheel of the pair of rail wheels will both be driven at differential ring gear speed. Not only does the construction of this invention tend to reduce the likelihood of derailment of the rail wheel assembly, but it also reduces the power loss which results from the slipping action of the rail wheel on the inner rail of a railway track curve. Also, it will be realized that by the provision of differential driving means in the rail wheel assembly of this invention, differences in sizes of the rail wheels will be compensated for, which differences may be due to tolerances in the manufacture of the rail wheels or due to uneven wear of the rail wheels. Manifestly, by the new and unique construction of the rail wheel assembly of the traction vehicle of this invention, the vehicle is adapted to transmit a draft force to a railway car along a straight section of tracks or a curve and under varying rail surface conditions.

Figure 9:
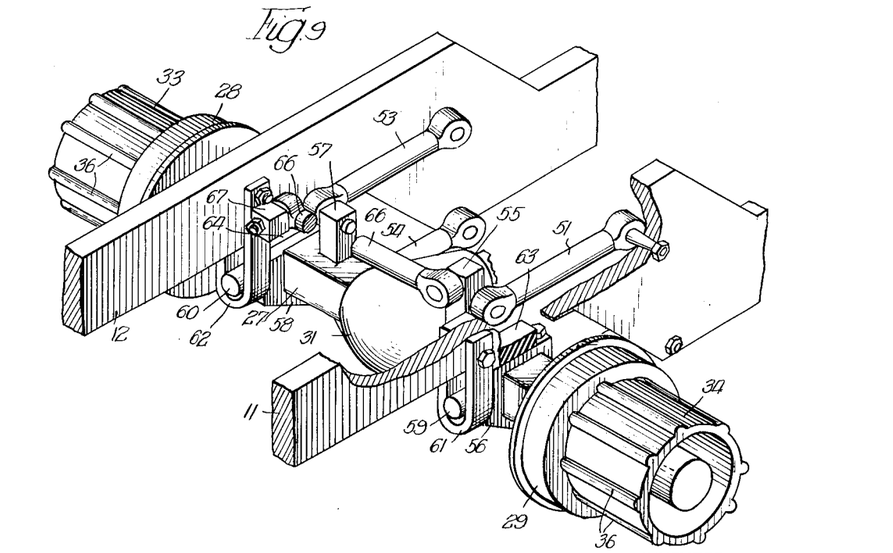
FIG. 9 is a partially broken away perspective view of the rail wheel assembly of the traction vehicle showing the front axle thereof.
Figure 10:
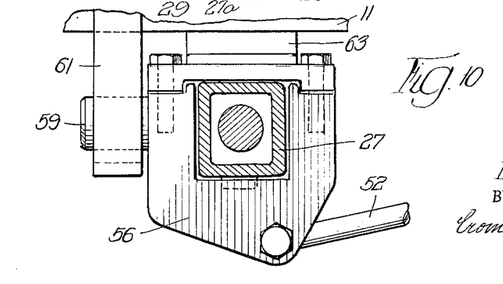
FIG. 10 is a section taken along the line 10—10 of FIG. 8.

The rear rail axle 37 of the rail wheel assembly is rigidly mounted to the frame members 11 and 12 in any suitable manner. The forward rail axle 27 is resiliently mounted to the frame members 11 and 12 as best seen in FIGS. 7, 8 and 9. As shown in FIG. 9 the front rail axle 27 extends beneath the frame members 11 and 12 and is mounted for limited vertical movement by a first pair of parallel bars 51 and 52 and a second pair of parallel bars 53 and 54. The bars 51 and 52 are each pivotally secured at one end thereof to the frame member 11. The other end of the bar 51 is pivotally secured to a stub 55, which stub extends integrally from the upper portion of the axle 27. The other end of the bar 52 is pivotally secured to a bracket 56, which bracket contains a central opening adapting the bracket to be clamped around the axle 27. Similarly, the bar 53 is pivotally secured at one end thereof to the frame member 12 and pivotally secured at the other end thereof to a stub 57, which stub extends integrally from the upper portion of the axle 27. The bar 54 is pivotally secured at one end thereof to the frame member 12 and pivotally secured at the other end thereof to a bracket 58, which bracket is identical to the bracket 56 and bolted to the axle 27. It should be apparent that by mounting the axle 27 to the frame members 11 and 12 by the pairs of parallel bars, the forward axle 27 is adapted for limited vertical movement. The downward limit of this movement is controlled by a pair of pins 59 and 60 extending from the brackets 56 and 58, respectively, which pins are adapted to move within respective U-shaped members 61 and 62 bolted to the frame members. Obviously, contact of the pins 59 and 60 in the bight portions of the brackets 61 and 62, respectively, limits downward movement of the axle 27 with respect to frame members 11 and 12. Upward movement of the axle 27, or downward movement of the traction vehicle frame, is limited by resilient engagement of a pair of resilient pads 63 and 64 with the underside of the frame members 11 and 12, respectively, which pads are attached to the upper surfaces of brackets 56 and 58. The pads, which are preferably made from a suitable elastomer, such as polyurethane, provide a resilient mounting or cushioning of the forward axle. A transversely extending sway rod 66 pivotally mounted at one end thereof to the stub 55 and pivotally mounted at the other end thereof to a block 67 attached to the bracket 62 is provided to position and strengthen the forward rail axle for receiving lateral forces.

The provision of the resiliently mounted forward rail axle in the rail wheel assembly of this invention permits all four rail wheels to remain in contact with a railway track even when the traction vehicle is traversing rather uneven track. As it is well known to those skilled in the art, railway ties supporting railway track settle unevenly into the earth thereby permitting the railway track to settle. This factor aggravates the derailing tendency mentioned above since it may permit a flange of one of the rail wheels to rise above a rail. If this occurs at a curve, there is a possibility of derailment. In the rail wheel assembly of this invention derailing is not likely since the movably mounted axle permits all rail wheels and their corresponding flanges to remain in contact with the rails within the limits of movement of the forward rail axle.

The traction vehicle of this invention includes a road wheel assembly of unique construction whereby road wheels are mounted for vertical swinging movement between an upper retracted position and a lower road engaging position in which certain road wheels are driven by a friction drive from the forward pair of rail wheels. This construction will be best understood by referring to FIG. 6 of the drawings. The road wheel assembly will be seen to include a pair of steerable road wheels 75, 76 and a pair of trailing road wheels 77, 78, which trailing road wheels have a track which is the same as the track of the steerable road wheels. Considering first the steerable road wheels, they will be found to be suitably mounted on stub or dummy axles extending from members 79, which members are pivotally secured to a pair of forward arms 80 and 81 and adapted for movement about a vertical axis when the road wheels are in their ground engaging position. Each of the road wheels 75 and 76 has a lug 79a integral with member 79 and pivotally secured to one end of a tie rod 82; preferably, steering movement is imparted to the steerable road wheels by means of a hydraulic cylinder 83 (see FIG. 4) pivotally mounted on arm 81 and having the piston rod thereof pivotally secured to a crank arm 84 attached to the member 79 of the road wheel 76. It will be realized that the steering mechanism is completely hydraulic, i.e., the piston rod of the cylinder 83 is the only member connected to the steering linkage of the steerable road wheels. The hydraulic cylinder 83 replaces the conventional pitman rod which would be subjected to binding and bending when the road wheels are raised and lowered. No such difficulty is encountered in the construction of this invention since the piston within the cylinder 83 is free to slide therein. The hydraulic steering mechanism used is adapted to function when the internal combustion engine of the traction vehicle is inoperative; turning movement of the steering wheel is sufficient to develop enough pressure for operation of the cylinder 83.

Figure 6:
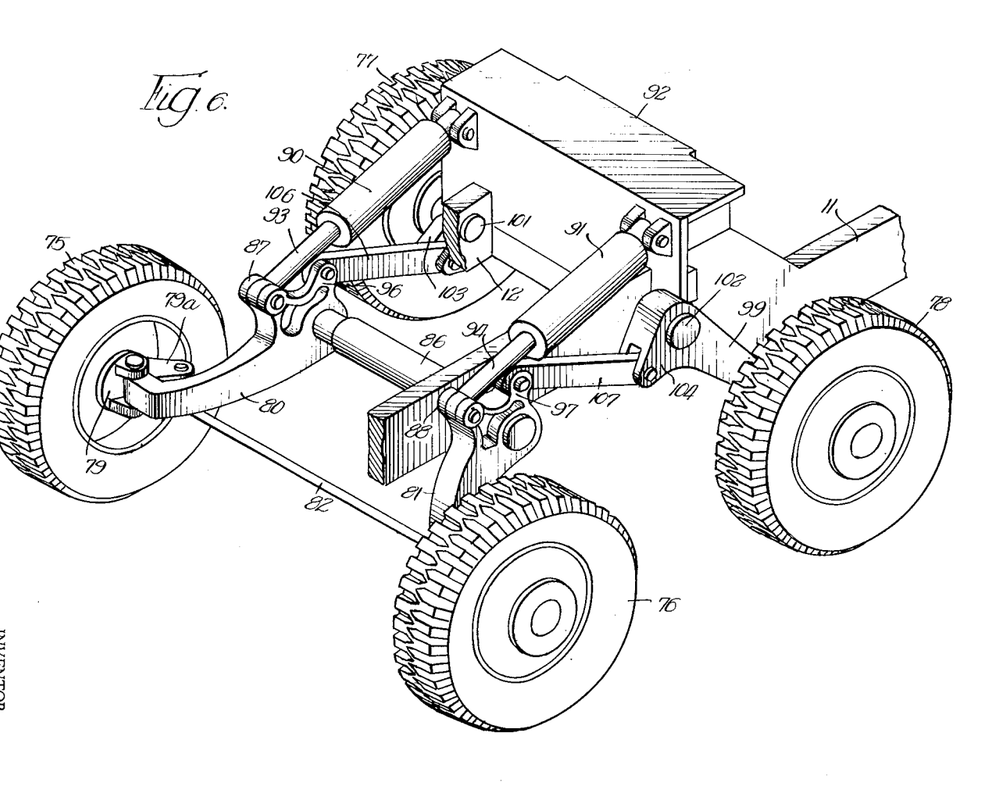
FIG. 6 is a perspective view of the road wheel assembly of the traction vehicle.

The arms 80 and 81 extend upwardly and inwardly and they are mounted to the ends of a shaft 86, which shaft is journaled at each end thereof in the frame members 11 and 12. The arms 80 and 81 include bifurcated lugs 87 and 88, respectively, extending integrally therefrom in a direction generally upwardly and forwardly from the axis of rotation of the shaft 86. A pair of hydraulic cylinders 90 and 91 are each pivotally secured at one end thereof to a transversely extending beam 92, which beam is rigidly secured at each end thereof to the frame members 11 and 12. The hydraulic cylinders include piston rods 93 and 94 which are pivotally attached at the outer ends thereof with the lugs 87 and 88, respectively. A second set of bifurcated lugs 96 and 97 integral with respective arms 80 and 81 extend upwardly in rearwardly spaced relation from the first mentioned pair of lugs.

The trailing road wheels 77 and 78, which are preferably provided with hydraulic brakes operable from within the cab 13, are each suitably rotatably mounted on stub or dummy axles which are rigidly secured to a pair of rearward arms 98 and 99. The arms 98 and 99 extend upwardly and inwardly and they are swingably mounted to a pair of pins 101 and 102, respectively, which pins are co-axially aligned and attached to the frame members. The arms 98 and 99 have integral bifurcated lugs 103 and 104, respectively, extending generally downward at a right angle from the major portion of the arms. A link 106 is pivotally mounted at one end thereof with the lug 96 and pivotally mounted at the other end thereof in the lug 103. Similarly, a link 107 is pivotally mounted at one end thereof in the lug 97 and pivotally mounted in the other end thereof in the lug 104.

Figure 4:
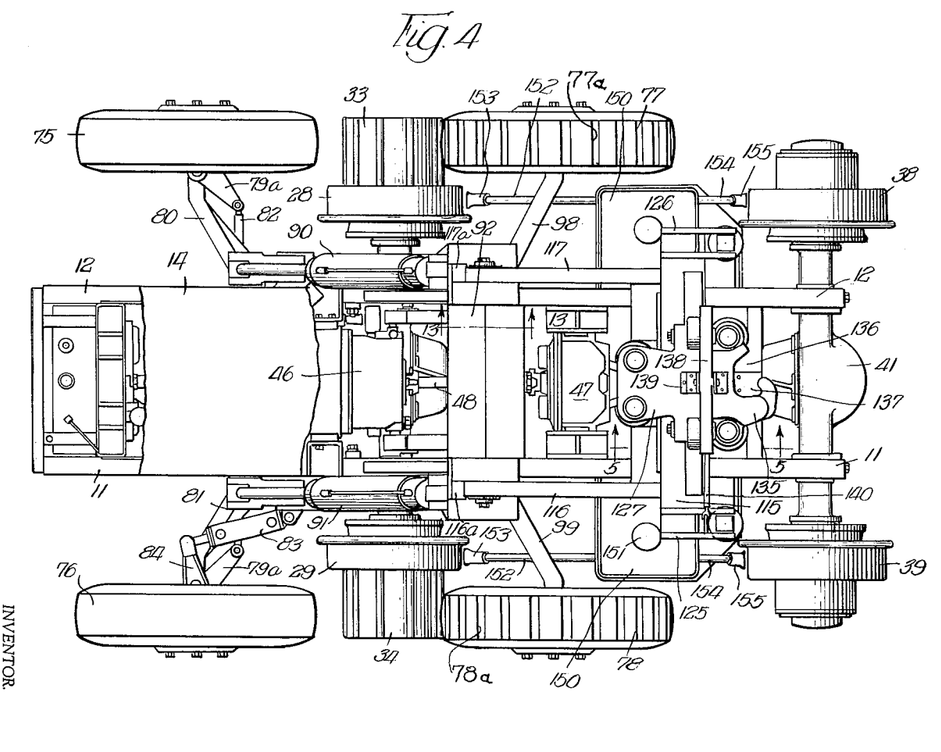
FIG. 4 is a partially broken away plan view of the rail traction vehicle.
Figure 5:
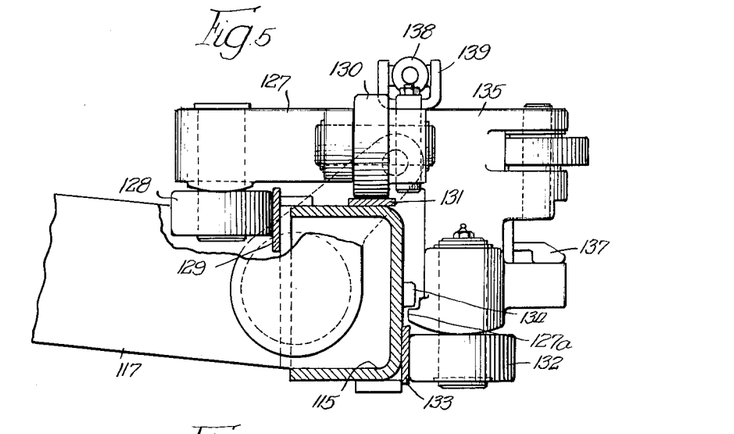
FIG. 5 is a section taken along the line 5—5 of FIG. 4.

In FIG. 6 the road wheel assembly is shown with the road wheels in their lower or ground engaging position. It will be apparent that upon actuation of the hydraulic cylinders 90 and 91 inward movement of the piston rods 93 and 94 will cause clockwise rotation (as seen from the right in FIG. 6) of the arms 80 and 81 thereby swinging the road wheels 75 and 76 generally upwardly and forwardly. This same movement of the piston rods will cause simultaneous counterclockwise rotation (as viewed from the right of FIG. 6) of the rear arms 98 and 99, by virtue of the connection of the links 106 and 107 with the arms, thereby resulting in swinging movement of the road wheels 77 and 78 generally upwardly and rearwardly. As best seen in FIG. 4, the trailing road wheels have a track which is the same as the track of the steerable road wheels, which track is the same as the track of the hubs 33 and 34 attached to the forward pair of rail wheels. As seen in FIG. 3, the road wheels assembly is so mounted and located on the frame of the traction vehicle with respect to the rail wheel assembly that when the road wheels are in their upper or retracted position they will permit the rail wheel assembly to support the traction vehicle for rail travel. When the road wheels are moved to their ground engaging position they are forced by the hydraulic cylinders 90 and 91 to a position substantially lower than the rail wheels thereby lifting the entire traction vehicle and rail wheel assembly secured thereto to a position where the rail wheels will no longer be in engagement with a railway track. When this step of lowering the road wheels, or raising of the traction vehicle and rail wheels, is being accomplished it will be noted that the trailing road wheels are forced into frictional contact with the hubs of the forward pair of rail wheels for being driven thereby. Manifestly, release of pressure in the cylinders 90 and 91 permits the traction vehicle to lower or settle until the rail wheels contact the rails of track on which the vehicle is to be used. It should be noted that by virtue of the linkage system just described, the traction vehicle will remain in horizonal disposition during raising and lowering of the same by the hydraulic cylinders. This is because the various arms supporting the road wheels are connected together by the links 106, 107 and the shaft 86, the length of the links and lugs engaged therewith being designed to provide the same rate of swinging movement of the pairs of steerable and trailing road wheels.

As best seen in FIGS. 3 and 4, in the preferred form of the invention the tires of the trailing road wheels 77 and 78 are provided with tread portions having transversely extending grooves 77a and 78a, repsectively. These grooves are circumferentially spaced for mating engagement with the ribs 36 of the driving hubs 33 and 34 associated with the rail wheel assembly. The provision of these ribs and grooves helps to prevent slippage between the driving hubs and the trailing road wheels, thereby greatly improving the friction drive for the road wheel assembly. This is an important feature since the treads of the trailing road wheels as well as the surfaces of the driving hubs can become wet and slippery, as, for example, when the traction vehicle is operating in inclement weather conditions. Of course it will be realized that other forms of surfaces could be provided on the driving hubs and trailing road wheels in lieu of the ribs 36, and grooves 77a, 78a. By way of example, circular protuberances or knobs could be provided on the driving hubs or trailing road wheels or both, or the driving hubs could be provided with special surfaces to accommodate the particular tread design of the trailing road wheels. Other tread forms for the trailing road wheels are shown in FIGS. 1 and 6.

It should be readily apparent that this novel mounting arrangement of the road wheels permits the driving rail wheels to drive the traction vehicle for rail travel and permits the forward pair of rail wheels to drive the traction vehicle for road travel by virtue of the frictional engagement of the driving hubs of the forward pair of rail wheels with the trailing road wheels. As mentioned above, the forward pair of rail wheels are mounted on a differential driving axle. Therefore, the traction vehicle can easily negotiate curves when the road wheels thereof are in their ground engaging position and are being driven by the rail wheels. Further, it will be apparent that this construction obviates the need of a separate drive means for the road wheels. This is an important feature as separate drive means for the road wheels would be rather complicated as it must be articulated and include disconnect means for disengaging the driven road wheels when they are in their raised position. It will be realized that by the construction of the road wheel assembly of this invention, the driven road wheels are automatically disengaged from the engine of the traction vehicle as the road wheels are shifted to their retracted position. Because the road wheels are driven in the manner shown, they may be mounted on short stub axles. This construction permits the space between the swinging road wheels to be used effectively for mounting of other components of the traction vehicle.

Figure 13:
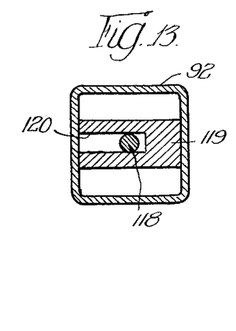
FIG. 13 is a section taken along the line 13—13 of FIG. 4.

The traction vehicle of this invention also includes an improved resiliently mounted coupler for mating arrangement with the coupler of a railway car for transmitting a draft force to the same and for transferring a portion of the weight of the railway car to the traction vehicle, thereby permitting an increase in the tractive effort developed by the traction vehicle. Referring to FIGS. 1 and 3–5, the coupler assembly will be seen to include a horizontally disposed beam 115 extending transversely of the traction vehicle and rigidly secured at the ends thereof to a pair of longitudinally extending coupler arms 116 and 117, which beam and arms define a unitary, generally horizontally extending, U-shaped member. The coupler arms 116 and 117 are pivotally secured at the forward or distal ends thereof to opposite ends of a cross-shaft 118 (see FIGS. 3 and 13), which cross-shaft is mounted within the beam 92. A pair of supports 119 are secured within the beam 92, which supports include horizontally extending slots 120. The cross-shaft 118 is adapted to be received within the slots 120 for rotation and for limited horizontal sliding movement transversely of the beam 92, which beam is rigidly secured to the frame members of the traction vehicle. A draft force is transmitted from the traction vehicle frame to the beam 115 by engagement of the cross-shaft 118 with the rear ends of the slots 120. As best seen in FIGS. 3 and 4, a pair of resilient pads 116a and 117a made of a suitable elastomer, such as polyurethane, are secured to the beam 92 and adapted to be engaged by the forward ends of the coupler arms 116 and 117, respectively. These pads provide shock dissipating cushioning means for the coupler assembly by engagement of the coupler arms with the resilient pads. Such a shock may result upon coupling of the traction vehicle with a railway car if the vehicle is backed into coupling engagement with a railway car at more than a crawl speed. This cushioning feature supplements the relatively stiff cushioning means provided in conventional railway cars thereby permitting faster coupling between the traction vehicle and a railway car. The traction vehicle coupler cushioning means also acts to absorb shocks which result upon sudden stopping of the traction vehicle when a railway car is coupled thereto.

It will be noted that the beam 115 is located between the rail axles of the rail wheel assembly so that when a portion of the weight of the railway car is transferred to the traction vehicle from this beam there will be no tendency for tipping of the vehicle. The beam 115 should not be mounted rearwardly of the rear rail axle of the traction vehicle to avoid any tendency of tipping of the vehicle.

The beam 115 is adapted for limited vertical movement for transferring weight to the traction vehicle, and a pair of hydraulic cylinders 121 and 122 are provided for vertically supporting the beam 115 and moving it upwardly. The hydraulic cylinders are pivotally secured at the lower ends thereof to the frame members and they include piston rods pivotally secured to brackets 125 and 126, which brackets extend from the ends of the beam 115. It will be noted that by the construction of the coupler assembly only a compressive force is taken by the hydraulic cylinders in that the entire draft force between the traction vehicle and a railway car will be taken by the beam 115 and coupler arms 116 and 117 and transferred to the vehicle frame by the cross-shaft 118. Also, it will be apparent that shocks in buff transmitted to the beam 115 will be absorbed by the pads 116a and 117a. Suitable hydraulic lines (not shown) permit the hydraulic cylinders 121 and 122 to be operated from the cab of the traction vehicle.

A carriage 127 is mounted on the beam 115 (FIGS. 4 and 5) and adapted for movement therealong by a plurality of sets of rollers, which rollers are rotatably mounted to the carriage. A first pair of rollers 128, each of which rollers is rotatably mounted to the carriage 127 for rotation about a vertical axis, are engageable with a bar 129, which bar is secured to the forward side of the beam 115 at the upper portion thereof and extends along the length of the beam. A second pair of rollers 130, each of which rollers is rotatably mounted to the carriage 127 for rotation about a horizontal axis, are engageable with a bar 131, which bar is attached to the upper surface of the beam 115 and extends the length thereof. A third pair of rollers 132, each of which rollers is rotatably mounted to the carriage 127 for rotation about a vertical axis, are engageable with a bar 133 secured to the rearward side of the beam 115 at the lower portion thereof, which bar extends along the length of the beam. Thus it will be apparent that the carriage 127 is adapted for rolling movement along the beam 115 and by virtue of the arrangement of rollers is adapted to receive a draft force from the beam 115. The carriage is prevented from being moved upwardly from the beam 115 by the provision of a bar 134 secured to the rear side of the beam 115, which bar overlies a projecting portion 127a extending integrally from the carriage 127.

Secured to the carriage 127 is a coupler head 135 suitably shaped for mating engagement with a standard railway car coupler. The coupler 135 defines an opening 136 for receiving the mating portion of a railway car coupler. The coupler 135 is provided with an integrally extending surface 137, which surface lies directly beneath the opening 136. When a railway car coupler is in mating engagement with the coupler 135, the surface 137 will be disposed directly beneath the railway car coupler and adapted to engage the same upon upward movement of the traction vehicle coupler assembly. Accordingly, when the coupler 135 is engaged with the coupler of the railway car and the hydraulic cylinders 121 and 122 are actuated, the beam 115 will be moved upwardly thereby transferring a portion of the weight of the car to the traction vehicle by engagement of the surface 137 with the underside of the railway car coupler which lifts the railway car slightly. In this way the tractive effort of the traction vehicle is substantially increased by a transfer of weight from the railway car.

The coupler assembly is necessarily a rather heavy structure because of the great draft force which must be transmitted to a railway car or cars. Accordingly, it has been found desirable to provide means for moving the carriage and coupler head attached thereto along the horizontal beam to expedite mating of the traction vehicle coupler with the coupler of the railway car. This is accomplished by providing a horizontally disposed hydraulic cylinder 138, which cylinder is secured to the carriage 127 by any suitable means, such as by a bracket 139. The cylinder 138 includes a piston and a piston rod 140, which piston rod is secured at the outer end thereof to one end of the beam 115. Appropriate hydraulic lines (not shown) connect the cylinder 138 with the hydraulic system of the traction vehicle and adapt the hydraulic cylinder to be actuated by an appropriate lever in the cab 13. It will be apparent that by this construction the traction vehicle coupler head is adapted to be hydraulically positioned along the beam 115 for mating engagement with the coupler of a railway car.

The coupler of the traction vehicle of this invention is not required to move arcuately about a fixed point. This feature is very important as it permits the traction vehicle to negotiate a relatively sharp curve when coupled with a railway car, as the traction vehicle coupler is adapted to move transversely of the traction vehicle a greater distance than would be possible if the coupler was pivotally mounted to the vehicle in a conventional manner. The traction vehicle coupler may be situated near the rear portion of the vehicle occupying little space and offering little, if any, interference with the rail wheel and road wheel assemblies. The coupler construction described provides for the effective transferring of a draft force to a railway car without limiting the ability of the carriage and coupler to move laterally. The construction of this coupler prevents longitudinal movement of the carriage and coupler secured thereto when a draft force is applied by the traction vehicle. Further, by provision of the pads 116a and 117a the traction vehicle coupler is adapted to cushion shocks which may result during coupling of the vehicle with a railway car or during sudden stopping of the vehicle when a railway car is coupled thereto.

Figure 11:
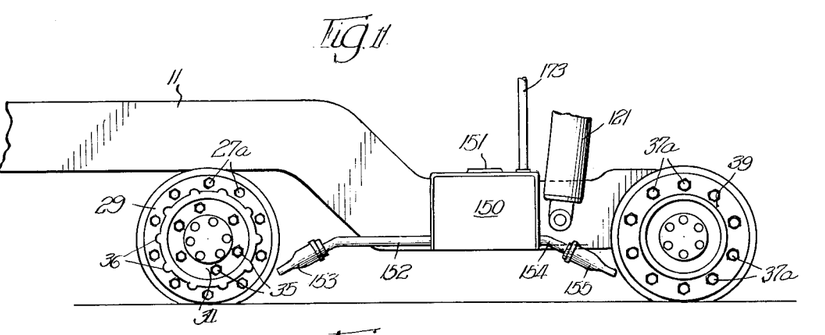
FIG. 11 is a partially broken away side view of the rail wheel assembly of the traction vehicle showing the apparatus for dispensing sand on the rail of a railway track.
Figure 12:
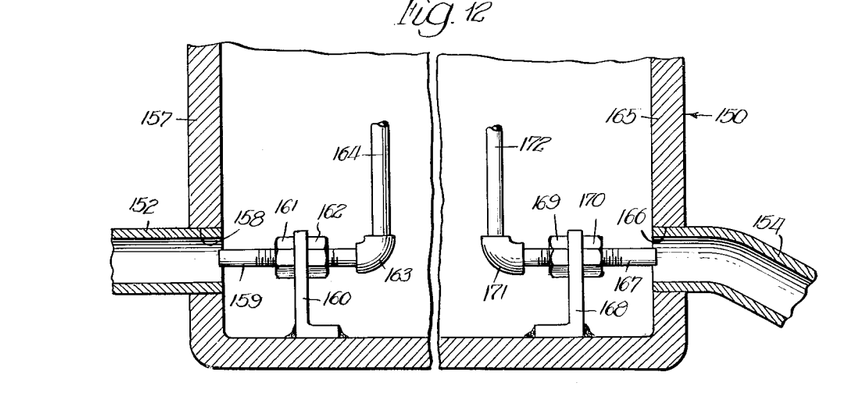
FIG. 12 is an enlarged fragmentary vertical section taken through the dispensing apparatus of FIG. 11.

The traction vehicle of this invention also includes improved means for pneumatically dispensing sand or the like on the rails of railway track supporting the vehicle to prevent slipping of the rail wheels of the traction vehicle when the track is slippery because of ice or snow, for example. FIG. 11 shows an embodiment of an apparatus for dispensing sand onto a rail supporting the rail wheels 29 and 39. It will be realized that another apparatus identical to the apparatus illustrated in FIG. 11, except that it is an opposite hand version of that shown in FIG. 11, is provided on the other side of the traction vehicle for dispensing sand on the rail supporting the rail wheels 28 and 38. The apparatus for dispensing sand or the like includes a hopper 150, which hooper is secured to the outside of the frame member 11 of the traction vehicle. The hopper 150 is adapted to contain a supply of sand, and the hopper may be filled by means of a cap 151 provided in the top of the hopper. A tubular member 152 extends forwardly of the hopper for dispensing sand on a rail just rearwardly of the forward rail wheel 29. A flexible tube 153 is secured to the outer end of the tubular member 152, which flexible tube has the outlet end thereof normally flattened for sealing the interior of the hopper 150 from the atmosphere. A second tubular member 154 extends rearwardly of the hopper 150 for dispensing sand on a rail just forward of the rear rail wheel 39. A flexible tube 155 is attached to the outlet end of the tubular member 154, which flexible tube has the outlet end thereof normally flattened in the manner of the tube 153. As seen in FIG. 12, a front wall 157 of the hopper is provided with an opening 158 for communicating the inside of the hopper with the tubular member 152. An air conduit 159 is supported in the hopper co-axial with the opening 158, which air conduit has the outlet end thereof disposed generally in the plane of the opening 258. The air conduit 159 is received in a non-threaded aperture in the upstanding leg of an angle member 160, which angle member has the other leg thereof welded or otherwise secured to the base of the hopper. The air conduit 159 is threaded along the length thereof adapting it to be axially adjusted in the angle 160 by means of a pair of nuts 161 and 162, each being threadingly engageable with the air conduit. In this manner, the amount of extension of the outlet end of the air conduit 159 in the opening 158 may be varied for controlling the amount of sand dispensed through the forward tubular member. An elbow 163 secures the air conduit 159 with another section of air conduit 164.

The hopper 150 includes a rear wall 165, which wall has an opening 166 communicating the interior of the hopper with the tubular member 154. The tubular member 154 is preferably bent downwardly from the rear wall of the hopper. A second air conduit 167 is supported in the rearward portion of the hopper 150 co-axial with the opening 166. The conduit 167 is received in a non-threaded aperture provided in the upstanding leg of an angle member 168, which angle member has its horizontally disposed leg welded or otherwise secured to the base of the hopper. The conduit 167 is threaded along the length thereof and held in place in the upstanding leg of the angle 168 by a pair of nuts 169 and 170, each being threadingly engageable with the air conduit. This construction adapts the tubular member 167 for axial adjustment in the angle 168 thereby varying the amount of insertion of the outlet end of the conduit in the opening 166 for controlling the amount of sand discharged to the tubular member 154. An elbow 171 communicates the air conduit 167 with a section of conduit 172. Preferably, the conduit sections 164 and 172 are each secured to a section of flexible tubing. The sections of flexible tubing then communicate with a T, which T is attached to a conduit 173 (FIG. 11) extending to an air compressor (not shown) driven by the internal combustion engine of the traction vehicle. A suitable control is provided in the cab of the traction vehicle allowing air to be supplied to the air conduits as desired for discharge of the contents of the hoppers.

The operation of the sand dispensing mechanism for preventing slipping of the rail wheels of the traction vehicle is as follows: the operator of the traction vehicle actuates an appropriate control in the cab of the vehicle allowing compressed air to be discharged through the air conduit 159 and the air conduit 167. As these air conduits are mounted in the lower portion of the hopper, they will normally be submerged by sand or the like contained in the hopper and the passage of air from these conduits will draw or force sand into the tubular members 152 and 154 and force it therefrom for being dispensed in the path of the rail wheels 29 and 39. The flow of air and sand through the tubular members 152 and 154 opens the normally flattened flexible tubes 153 and 155, respectively, allowing the sand to be dispensed.

It is desirable to have equal amounts of sand dispensed in equal rates from the forward tubular member and the rearward tubular member. Because of the substantial difference in the length of these members, their line losses differ substantially, i.e., the longer tubular member has the greatest line loss. This difference can be compensated for by varying the amount of insertion of the outlet ends of the air conduits in their corresponding openings in the walls of the hopper. The amount of sand dispensed through any one tubular member can be increased by decreasing the amount of extension of the corresponding air conduit in its hopper wall opening. Axial adjustment of each of the air conduits is made possible by provision of the external threads along the lengths thereof and by the nuts threadingly engageable with the air conduits.

It should be apparent that the sand dispensing apparatus described provides for a simple but yet effective means for dispensing sand on a railway track supporting the traction vehicle. The apparatus has few parts making the same unlikely to become inoperative, and the apparatus includes adjustment means making possible the pneumatic dispensing of equal amounts of sand in equal rates in the vicinity of all four rail wheels of the traction vehicle irrespective of the location of the sand hopper of the apparatus.

While the invention has been shown in but one form it will be obvious to those skilled in the art that it is not to be so limited, but on the contrary it is susceptible of various changes and modifications without departing from the spirit and scope of the appended claims.

I claim:

1. In a rail traction vehicle of the type having a frame, an engine and a transmission carried by the frame, the improvement which comprises: a vehicle coupler carried by the frame for movement in a generally vertical direction and for shifting movement laterally of the vehicle as the latter traverses a curve with a railway car coupled thereto, said vehicle coupler including a generally horizontal pad for engagement with a lower surface of a railway car coupler, means for lifting the vehicle coupler and thereby transferring a portion of the weight of the railway car to said vehicle coupler, first and second rail wheel axles on the frame spaced horizontally forwardly and rearwardly, respectively, of the point of load application between said vehicle coupler and the frame, said second axle being rigidly mounted to said frame and spaced nearer said point of load application than said first axle, said first axle being resiliently mounted to said frame, and driving means for driving both of said rail wheel axles, said means including a non-slip differential on said second rail wheel axle thereby to minimize loss of traction upon slipping of one rail wheel.

2. In a combined road and rail vehicle, a rail wheel assembly adapted for independently supporting the vehicle for rail travel, which assembly comprises first and second pairs of rail wheels and differential drive means for driving one of the pairs of rail wheels, a road wheel assembly adapted for independently supporting the vehicle for road travel, which assembly comprises first and second pairs of road wheels and mounting means for shifting said road wheels between a retracted position and a road engaging position, said pair of rail wheels driven by said differential drive means having means associated therewith for driving one of the pairs of road wheels when the latter are in their road engaging position.

3. In a combined road and rail vehicle, a rail wheel assembly adapted for independently supporting the vehicle for rail travel, which assembly comprises a first pair of rail wheels having differential drive means associated therewith and a second pair of rail wheels, each of the rail wheels of said first pair of rail wheels having a rail engaging tread surface and a cylindrical driving surface associated therewith, a road wheel assembly adapted for independently supporting the vehicle for road travel, which assembly comprises a pair of steerable road wheels and a pair of trailing road wheels, mounting means on said vehicle for shifting said pairs of road wheels generally vertically between a retracted position above said pairs of rail wheels and a road engaging position below said pair of rail wheels wherein said trailing road wheels frictionally engage, respectively, said cylindrical driving surfaces for being driven thereby.

4. The structure according to claim 3 wherein each of said cylindrical driving surfaces is provided with a first surface configuration and wherein the tread of each of said trailing road wheels is provided with a second surface configuration, said first surface configurations being adapted for mating engagement with said second surface configurations, respectively, for increasing the frictional drive between said first pair of rail wheels and said trailing road wheels.

5. In a combined road and rail vehicle, a first set of wheels journaled to the vehicle for independently supporting the same for longitudinal movement wherein each of said wheels has a rail engaging tread surface and wherein at least one of said wheels has a cylindrical driving surface associated therewith, a second set of wheels on the vehicle for independently supporting the same for longitudinal movement, and means on the vehicle for shifting said second set of wheels generally vertically between a retracted position above said first set of wheels and a road engaging position below said first set of wheels wherein one of the wheels of said second set of wheels frictionally engages said cylindrical driving surface.

6. In a combined road and rail vehicle, a rail wheel assembly adapted for independently supporting the vehicle for rail travel, which assembly comprises first and second pairs of driving rail wheels with each of the rail wheels of one of said pairs of rail wheels having a rail engaging tread surface and a cylindrical driving surface associated therewith, a road wheel assembly adapted for independently supporting the vehicle for road travel, which assembly comprises a pair of steerable road wheels and a pair of trailing road wheels, mounting means on said vehicle for simultaneously shifting said pairs of road wheels generally vertically between a retracted position above said pairs of rail wheels and a road engaging position below said pairs of rail wheels wherein said trailing road wheels frictionally engage, respectively, said cylindrical driving surfaces.

7. The structure according to claim 6 wherein each of said cylindrical driving surfaces is provided with a first surface configuration and wherein the tread of each of said trailing road wheels is provided with a second surface configuration, said first surface configurations being adapted for mating engagement with said second surface configurations, respectively, for increasing the frictional drive between said first pair of rail wheels and said trailing road wheels.

8. In a combined road and rail vehicle, a rail wheel assembly adapted for independently supporting the vehicle for rail travel, which assembly comprises first and second pairs of driving rail wheels with each of the rail wheels of one of said pairs of rail wheels having a rail engaging tread surface and a cylindrical driving surface associated therewith, a road wheel assembly adapted for independently supporting the vehicle for road travel, which assembly comprises a pair of steerable road wheels and a pair of trailing road wheels, mounting means on said vehicle for simultaneously shifting said pairs of road wheels generally vertically between a retracted position above said pairs of rail wheels and a road engaging position below said pairs of rail wheels wherein said pair of trailing road wheels frictionally engage, respectively, said cylindrical driving surfaces, the axis of rotation of said pair of trailing road wheels being parallel to the respective axes of rotation of said pairs of rail wheels.

9. In a combined road and rail vehicle, first and second pairs of rail wheels mounted to the vehicle wherein each of said rail wheels has a rail engaging tread surface and wherein each of the wheels of one of said pairs has a cylindrical driving surface associated therewith, a set of road wheels swingably mounted to the vehicle comprising, a pair of steerable road wheels each being rotatably mounted on separate pivotable stub axles, and a pair of trailing road wheels each being rotatably mounted on separate stub axles, the axis of rotation of the trailing road wheels being parallel to the axis of rotation of the rail wheels, and the track of the trailing road wheels being substantially the same as the track of said cylindrical driving surfaces.

10. In a combined road and rail vehicle, a rail wheel assembly adapted for independently supporting the vehicle for rail travel, a road wheel assembly adapted for independently supporting the vehicle for road travel, which assembly comprises, a pair of steerable road wheels and a pair of trailing road wheels, each of the steerable road wheels being rotatably mounted on separate stub axles, said axles being pivotally secured to common first support means, which means is swingably mounted to said vehicle, each of the trailing road wheels being rotatably mounted on separate stub axles, said second mentioned axles being rigidly secured to second support means, which means is swingably mounted to said vehicle, and additional means on the vehicle engageable with said first and second support means for swinging said road wheels between retracted and road engaging positions.

11. In a combined road and rail vehicle, a rail wheel assembly adapted for independently supporting and moving the vehicle for rail travel, which assembly comprises first and second pairs of rail wheels, a road wheel assembly adapted for independently supporting the vehicle for road travel, which road wheel assembly comprises, a pair of steerable road wheels each being rotatably mounted on separate pivotable stub axles, and a pair of trailing road wheels each being rotatably mounted on separate stub axles, the axis of rotation of the trailing road wheels being parallel to the respective axes of rotation of the rail wheels, the track of the trailing road wheels being generally the same as the track of the rail wheels, and powered linkage means on said vehicle engageable with all of said stub axles for swinging said road wheels in unison between retracted and road engaging positions.

12. In a combined road and rail vehicle, a rail wheel assembly adapted for independently supporting and moving the vehicle for rail travel, which assembly comprises first and second pairs of laterally spaced driving rail wheels with each of the rail wheels of one of said pairs of rail wheels having a driving hub extending co-axially therefrom, a road wheel assembly adapted for independently supporting the vehicle for road travel, which road wheel assembly comprises a pair of laterally spaced steerable road wheels and a pair of laterally spaced trailing road wheels, each of the steerable road wheels being rotatably mounted on separate stub axles, said axles being pivotally secured to a pair of arms, respectively, which arms are swingably mounted to said vehicle, each of the trailing road wheels being rotatably mountde on separate stub axles, said second mentioned axles being rigidly secured to a second pair of arms, respectively, which arms are swingably mounted to said vehicle, the axis of rotation of the trailing road wheels being parallel to respective axes of rotation of said wheels, the track of the trailing road wheels being substantially the same as the track of said hubs, and means on said vehicle engageable with all of said arms for swinging said road wheels between a retracted position and a road engaging position wherein said pair of trailing wheels frictionally engage, respectively, said driving hubs for being driven thereby.

13. In a combined road and rail vehicle, a rail wheel assembly adapted for independently supporting the vehicle for rail travel, a road wheel assembly adapted for independently supporting the vehicle for road travel, which assembly comprises a pair of steerable road wheels and a pair of trailing road wheels, each of the steerable road wheels being rotatably mounted on separate stub axles, said axles being pivotally secured to a first pair of arms, respectively, which arms are swingably mounted to said vehicle, each of the trailing road wheels being rotatably mounted on separate stub axles, said second mentioned stub axles being rigidly secured to a second pair of arms, respectively, which arms are swingably mounted to said vehicle, linkage means connecting said first pair of arms with said second pair of arms, respectively, and hydraulic means for actuating all of said arms in unison for simultaneously swinging said steerable road wheels and said trailing road wheels between retracted and road engaging positions.

14. In a traction vehicle of the type having a coupler for transferring a portion of the weight of a railway car to the vehicle, a rail wheel assembly comprising, a pair of driving axles each having rail wheels associated therewith, one of said axles being rigidly secured to said vehicle and the other of said axles being movably mounted to said vehicle for limited vertical movement.

15. In a traction vehicle of the type having a frame and a coupler for transferring a portion of the weight of a railway car to the vehicle, a rail wheel assembly comprising, first and second rail wheel axles spaced horizontally forwardly and rearwardly, respectively, of the point of load application between said coupler and the frame, said first axle being resiliently mounted to said vehicle and spaced a greater distance from said coupler than said second axle, said second axle being rigidly secured to said vehicle.

16. In a traction vehicle of the type having a pair of laterally spaced longitudinally extending frame members and a couplre for transferring a portion of the weight of the railway car to the vehicle, a rail wheel assembly comprising, a first driving axle movably mounted to said vehicle, a second driving axle rigidly mounted to said vehicle and rail wheels on each end of said axles, said first axle extending transversely beneath said frame members, means on each of said frame members engaging said first axle for permitting limited vertical movement of the first axle, and separate resilient means interposed between each of said frame members and said first axle.

17. In the traction vehicle according to claim 16 wherein said resilient means comprises an elastomer pad.

18. In a traction vehicle of the type having a pair of laterally spaced longitudinally extending frame members and a coupler for transferring a portion of the weight of the railway car to the vehicle, a rail wheel assembly comprising, a first driving axle movably mounted to said vehicle, a second driving axle rigidly mounted to said vehicle and rail wheels on each end of said axles, said first axle extending transversely beneath said frame members, a pair of vertically spaced parallel bars at each end of said first axle for movably mounting the same to said frame members, respectively, each of said bars having one end thereof pivotally secured to said first axle and the other end thereof pivotally secured to the corresponding frame member, and separate resilient means interposed between each of said frame members and said first axle.

19. In a rail traction vehicle a coupling assembly comprising, a generally horizontal beam mounted to the vehicle transverse to the direction of vehicle movement and adapted for limited vertical movement, hydraulic means for moving the beam upwardly, a carriage mounted on the beam for sliding movement therealong, said beam serving as the sole support for said carriage, a vehicle coupler head on the carriage shaped for mating engagement with a railway car coupler, a rigid member on the carriage for engagement with the lower surface of the railway coupler when said hydraulic means is actuated after engagement of the vehicle coupler head with the car coupler, said assembly having cushioning means associated therewith for dissipating shocks in buff transmitted to said vehicle coupler head.

20. In a rail traction vehicle having a frame, a coupling assembly comprising, a generally horizontal beam disposed transverse to the direction of vehicle movement, a pair of generally horizontal longitudinal extending arms secured at the rear ends thereof to respective ends of said beam, said arms being mounted at the forward ends thereof to said frame for limited vertical swinging movement and for limited longitudinal movement, resilient means interposed between said frame and said arms for cushioning forward longitudinal movement of the arms, hydraulic cylinder means engageable with said frame and with said beam for forcing the beam upwardly, a carriage having means engageable with said beam for supporting the carriage for movement along the beam, a vehicle coupler head on the carirage shaped for mating engagement with a railway car coupler, a rigid member on the carriage for engagement with the lower surface of the railway car coupler when said beam is moved upwardly after engagement of the vehicle coupler head with the car coupler.

21. In a rail traction vehicle having a frame, a coupling assembly comprising, a generally horizontal first beam disposed transverse to the direction of vehicle movement, a pair of generally horizontal longitudinally extending arms secured at the rear ends thereof to respective ends of said first beam, said arms being secured at the forward ends thereof to respective ends of a cross-shaft, a second beam disposed parallel to said first beam and spaced forwardly of the latter, which second beam is rigidly secured to said frame, said cross-shaft being mounted to said second beam for rotation and for horizontal sliding movement transversely of the second beam, thereby adapting the arms for limited vertical swinging movement and for limited longitudinal movement, resilient means secured to said second beam and adapted to be engaged by each of said arms for cushioning longitudinal movement of the arms, a pair of hydraulic cylinders engageable with said frame and with respective ends of said first beam for forcing the first beam upwardly, a carriage having a plurality of rollers engageable with sides of said first beam for suporting the cariage for movement along the beam, a vehicle coupler head on the carriage shaped for mating engagement with a railway car coupler and defining an opening, a rigid member on the carriage below the opening for engagement with the lower surface of the railway car coupler when said first beam is moved upwardly.

22. In a rail traction vehicle, coupler apparatus comprising, a beam, means mounting the beam adjacent one end of the vehicle in horizontal disposition and generally transversely of the direction of vehicle movement, said mounting means supporting the beam for movement about an axis substantially parallel with the beam and spaced from the latter inwardly of the vehicle, fluid cylinder means engaging the vehicle and the beam for moving the latter through a limited arc about said axis, a carriage mounted on the beam for sliding movement therealong, a vehicle coupler head on the carriage shaped for mating engagement with a railway car coupler, a fixed member on the carriage for engagement with the lower surface of a railway car coupler when said fluid cylinder means are actuated after engagement of the vehicle coupler head with a car coupler.

23. In a rail traction vehicle, coupler apparatus comprising, a unitary, generally horizontally extending, U-shaped member including a beam adjacent one end of the vehicle and extending transversely of the direction of vehicle movement and a pair of arms extending parallel with the direction of vehicle movement, pivot means mounting the distal ends of said arms to the vehicle for pivoting about a common axis substantially parallel with said beam and spaced from the latter inwardly of the vehicle, fluid cylinder means engaging the vehicle and the U-shaped member for moving of the latter through a limited arc about said axis, a carriage mounted on the beam for sliding movement therealong, a vehicle coupler head on the carriage shaped for mating engagement with a railway car coupler, a member on the carriage for engagement with the lower surface of a railway car coupler when said fluid cylinder means are actuated after engagement of the vehicle coupler head with a car coupler.

24. The structure defined in claim 23 wherein said pivot means is adapted for limited movement longitudinally of the direction of vehicle movement, resilient means interposed between fixed means on the vehicle and the distal ends of said arms for cushioning movement of the U-shaped member inwardly of the vehicle, thereby to minimize the shock forces upon coupling of the vehicle with a railway car.

25. In a rail traction vehicle, coupler apparatus comprising a draft beam, means for mounting said beam adjacent one end of the vehicle in horizontal disposition and generally transversely of the direction of vehicle movement, said mounting means supporting said beam for lifting and lowering movement and including a pair of arms extending at generally right angles to said beam, which arms have corresponding ends thereof connected to opposite ends of said beam thereby to define a generally horizontally disposed U-shaped structure, said arms having their other ends connected to the vehicle thereby to transfer draft and pushing forces from the latter to said beam, means engaging the vehicle and said mounting means for forcing the beam upwardly, a carriage mounted on the beam for sliding movement therealong, said beam serving as the sole support for the carriage, a vehicle coupler head on the carriage shaped for mating draft engagement with a railway car coupler, and a member on the carriage below the vehicle coupler head for engagement with the lower surface of a railway car coupler when said beam is forced upwardly after engagement of the vehicle coupler head with the car coupler.

References Cited by the Examiner

UNITED STATES PATENTS

| | | | |
|---|---|---|---|
| 296,017 | 4/84 | Jordan | 259—43 |
| 322,575 | 7/85 | Black | 259—43 |
| 737,883 | 9/03 | Synnestvedt | 105—26 |
| 1,012,255 | 12/11 | Hogan | 213—2 |
| 1,033,197 | 7/12 | Rothwell | 291—3 |
| 1,403,878 | 1/22 | Swearingen | 291—3 |
| 1,748,309 | 2/30 | Rose | 104—28 |
| 2,036,194 | 4/36 | Burrows et al. | 105—118 |
| 2,530,472 | 11/50 | Lee | 105—26 |
| 2,624,216 | 1/53 | Nielsen | 74—711 |
| 2,718,195 | 9/55 | Bock et al. | 105—90 |
| 2,722,897 | 11/55 | Morey | 105—73 |
| 2,979,359 | 4/61 | Tripp | 295—8.5 |
| 3,002,469 | 10/61 | Wanner | 105—215 |
| 3,019,742 | 2/62 | Kershaw | 105—215 |
| 3,097,545 | 7/63 | Immel | 74—711 |

ENGENE G. BOTZ, *Primary Examiner.*

LEO QUACKENBUSH, *Examiner.*

UNITED STATES PATENT OFFICE
CERTIFICATE OF CORRECTION

Patent No. 3,198,137　　　　　　　　　　　　　　　August 3, 1965

Eugene B. White, Jr.

It is hereby certified that error appears in the above numbered patent requiring correction and that the said Letters Patent should read as corrected below.

Column 4, line 33, for "to" read -- on --; column 6, line 72, and column 7, line 1, for "make", each occurrence, read -- making --; column 8, line 63, for "there of" read -- thereof --; column 9, line 58, for "repsectively" read -- respectively --; column 10, line 32, for "arrange-" read -- engage- --; column 12, line 54, for "hooper" read -- hopper --; column 13, line 1, for "258" read -- 158 --; column 16, line 41, for "mountde" read -- mounted --; column 16, line 45, after "said" insert -- rail --; column 17, line 16, for "couplre" read -- coupler --; line 61, for "longitudinal" read -- longitudinally --.

Signed and sealed this 3rd day of May 1966.

(SEAL)
Attest:

ERNEST W. SWIDER　　　　　　　　　　　　　　　EDWARD J. BRENNER
Attesting Officer　　　　　　　　　　　　　　　Commissioner of Patents